(12) United States Patent
Vandermeulen

(10) Patent No.: US 10,024,601 B2
(45) Date of Patent: *Jul. 17, 2018

(54) METHODS AND SYSTEMS FOR COOLING BUILDINGS WITH LARGE HEAT LOADS USING DESICCANT CHILLERS

(71) Applicant: 7AC Technologies, Inc., Beverly, MA (US)

(72) Inventor: Peter F. Vandermeulen, Newburyport, MA (US)

(73) Assignee: 7AC Technologies, Inc., Beverly, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/362,288

(22) Filed: Nov. 28, 2016

(65) Prior Publication Data
US 2017/0167794 A1 Jun. 15, 2017

Related U.S. Application Data

(63) Continuation of application No. 14/096,445, filed on Dec. 4, 2013, now Pat. No. 9,506,697.
(Continued)

(51) Int. Cl.
*F28C 1/16* (2006.01)
*F24F 5/00* (2006.01)
(Continued)

(52) U.S. Cl.
CPC .............. *F28C 1/16* (2013.01); *B01D 53/263* (2013.01); *F24F 5/0014* (2013.01); *F28C 2001/006* (2013.01)

(58) Field of Classification Search
CPC .... F28C 1/16; F28C 2001/006; B01D 53/263; F24F 5/0014
See application file for complete search history.

(56) References Cited

U.S. PATENT DOCUMENTS 1,791,086 A 2/1931 Sperr
2,221,787 A 11/1940 Downs et al.
(Continued)

FOREIGN PATENT DOCUMENTS

CN 100366981 C 2/2008
CN 100476308 C 4/2009
(Continued)

OTHER PUBLICATIONS

"Siphon." Encyclopedia Americana. Grolier Online, 2015. Web. Apr. 3, 2015. 1 page.
(Continued)

*Primary Examiner* — Emmanuel Duke
(74) *Attorney, Agent, or Firm* — Foley Hoag LLP; Rajesh Vallabh

(57) ABSTRACT

A system for providing cooling to a building includes a cooling tower for transferring waste heat from the building to the atmosphere and a liquid desiccant system for dehumidifying an air stream entering the cooling tower to increase cooling efficiency of the cooling tower. The liquid desiccant system includes a conditioner and a regenerator. The conditioner utilizes a liquid desiccant for dehumidifying the air stream entering the cooling tower. The regenerator is connected to the conditioner for receiving dilute liquid desiccant from the conditioner, concentrating the dilute liquid desiccant using waste heat from the building, and returning concentrated liquid desiccant to the conditioner.

20 Claims, 6 Drawing Sheets

Related U.S. Application Data

(60) Provisional application No. 61/787,948, filed on Mar. 15, 2013, provisional application No. 61/733,209, filed on Dec. 4, 2012.

(51) Int. Cl.
*B01D 53/26* (2006.01)
*F28C 1/00* (2006.01)

(56) References Cited

U.S. PATENT DOCUMENTS

| | | |
|---|---|---|
| 2,235,322 A | 3/1941 | Martin |
| 2,433,741 A | 12/1947 | Crawford |
| 2,634,958 A | 4/1953 | Simpelaar |
| 2,660,159 A | 11/1953 | Hughes |
| 2,708,915 A | 5/1955 | Mandelburg |
| 2,988,171 A | 6/1961 | Arnold et al. |
| 3,119,446 A | 1/1964 | Weiss |
| 3,193,001 A | 7/1965 | Meckler |
| 3,276,634 A | 10/1966 | Arnot |
| 3,409,969 A | 11/1968 | Simons |
| 3,410,581 A | 11/1968 | Christensen |
| 3,455,338 A | 7/1969 | Pollit |
| 3,718,181 A | 2/1973 | Reilly et al. |
| 4,100,331 A | 7/1978 | Fletcher et al. |
| 4,164,125 A | 8/1979 | Griffiths |
| 4,176,523 A | 12/1979 | Rousseau |
| 4,205,529 A * | 6/1980 | Ko .................. F24F 3/1417 62/235.1 |
| 4,209,368 A | 6/1980 | Coker et al. |
| 4,222,244 A | 9/1980 | Meckler |
| 4,235,221 A | 11/1980 | Murphy |
| 4,239,507 A | 12/1980 | Benoit et al. |
| 4,259,849 A | 4/1981 | Griffiths |
| 4,324,947 A | 4/1982 | Dumbeck |
| 4,399,862 A | 8/1983 | Hile |
| 4,429,545 A | 2/1984 | Steinberg |
| 4,435,339 A | 3/1984 | Kragh |
| 4,444,992 A | 4/1984 | Cox, III |
| 4,583,996 A | 4/1986 | Sakata et al. |
| 4,607,132 A | 8/1986 | Jarnagin |
| 4,612,019 A | 9/1986 | Langhorst |
| 4,649,899 A | 3/1987 | Moore |
| 4,691,530 A * | 9/1987 | Meckler .................. F24F 3/1417 62/238.1 |
| 4,703,629 A | 11/1987 | Moore |
| 4,730,600 A | 3/1988 | Harrigill |
| 4,744,414 A | 5/1988 | Schon |
| 4,766,952 A | 8/1988 | Onodera |
| 4,786,301 A | 11/1988 | Rhodes |
| 4,832,115 A | 5/1989 | Albers et al. |
| 4,872,578 A | 10/1989 | Fuerschbach et al. |
| 4,882,907 A | 11/1989 | Brown, II |
| 4,887,438 A | 12/1989 | Meckler |
| 4,900,448 A | 2/1990 | Bonne et al. |
| 4,910,971 A | 3/1990 | McNab |
| 4,939,906 A | 7/1990 | Spatz et al. |
| 4,941,324 A | 7/1990 | Peterson et al. |
| 4,955,205 A | 9/1990 | Wilkinson |
| 4,971,142 A | 11/1990 | Mergler |
| 4,976,313 A | 12/1990 | Dahlgren et al. |
| 4,979,965 A | 12/1990 | Sannholm |
| 4,984,434 A * | 1/1991 | Peterson .................. F24F 3/1411 62/271 |
| 4,987,750 A | 1/1991 | Meckler |
| 5,005,371 A | 4/1991 | Yonezawa et al. |
| 5,181,387 A | 1/1993 | Meckler |
| 5,182,921 A | 2/1993 | Yan |
| 5,186,903 A | 2/1993 | Cornwell |
| 5,191,771 A | 3/1993 | Meckler |
| 5,221,520 A | 6/1993 | Cornwell |
| 5,351,497 A | 10/1994 | Lowenstein |
| 5,375,429 A | 12/1994 | Tokizaki et al. |
| 5,462,113 A | 10/1995 | Wand |
| 5,471,852 A | 12/1995 | Meckler |
| 5,528,905 A | 6/1996 | Scarlatti |
| 5,534,186 A | 7/1996 | Walker et al. |
| 5,582,026 A | 12/1996 | Barto, Sr. |
| 5,595,690 A | 1/1997 | Filburn et al. |
| 5,605,628 A | 2/1997 | Davidson et al. |
| 5,638,900 A | 6/1997 | Lowenstein et al. |
| 5,641,337 A | 6/1997 | Arrowsmith et al. |
| 5,661,983 A | 9/1997 | Groten et al. |
| 5,685,152 A | 11/1997 | Sterling |
| 5,685,485 A | 11/1997 | Mock et al. |
| 5,797,272 A | 8/1998 | James |
| 5,832,993 A | 11/1998 | Ohata et al. |
| 5,860,284 A | 1/1999 | Goland et al. |
| 5,860,285 A | 1/1999 | Tulpule |
| 5,928,808 A | 7/1999 | Eshraghi |
| 5,933,702 A | 8/1999 | Goswami |
| 6,018,954 A | 2/2000 | Assaf |
| 6,083,387 A | 7/2000 | LeBlanc et al. |
| 6,103,969 A | 8/2000 | Bussey |
| 6,138,470 A | 10/2000 | Potnis et al. |
| 6,156,102 A | 12/2000 | Conrad et al. |
| 6,171,374 B1 | 1/2001 | Barton et al. |
| 6,216,483 B1 | 4/2001 | Potnis et al. |
| 6,216,489 B1 | 4/2001 | Potnis et al. |
| 6,244,062 B1 | 6/2001 | Prado |
| 6,247,604 B1 | 6/2001 | Taskis et al. |
| 6,266,975 B1 | 7/2001 | Assaf |
| 6,417,423 B1 | 7/2002 | Koper et al. |
| 6,442,951 B1 | 9/2002 | Maeda et al. |
| 6,463,750 B2 | 10/2002 | Assaf |
| 6,487,872 B1 | 12/2002 | Forkosh et al. |
| 6,488,900 B1 | 12/2002 | Call et al. |
| 6,497,107 B2 | 12/2002 | Maisotsenko et al. |
| 6,497,749 B2 | 12/2002 | Kesten et al. |
| 6,502,807 B1 | 1/2003 | Assaf et al. |
| 6,514,321 B1 | 2/2003 | Lehto et al. |
| 6,539,731 B2 | 4/2003 | Kesten et al. |
| 6,546,746 B2 | 4/2003 | Forkosh et al. |
| 6,557,365 B2 | 5/2003 | Dinnage et al. |
| 6,660,069 B2 | 12/2003 | Sato et al. |
| 6,684,649 B1 | 2/2004 | Thompson |
| 6,739,142 B2 | 5/2004 | Korin |
| 6,745,826 B2 | 6/2004 | Lowenstein et al. |
| 6,766,817 B2 | 7/2004 | da Silva et al. |
| 6,854,278 B2 | 2/2005 | Maisotsenko et al. |
| 6,854,279 B1 | 2/2005 | Digiovanni et al. |
| 6,918,404 B2 | 7/2005 | Dias da Silva et al. |
| 6,938,434 B1 | 9/2005 | Fair |
| 6,976,365 B2 * | 12/2005 | Forkosh .................. F24F 3/1417 62/173 |
| 6,986,428 B2 | 1/2006 | Hester et al. |
| 7,066,586 B2 | 6/2006 | da Silva et al. |
| RE39,288 E | 9/2006 | Assaf |
| 7,143,597 B2 | 12/2006 | Hyland et al. |
| 7,191,821 B2 | 3/2007 | Gronwall et al. |
| 7,197,887 B2 | 4/2007 | Maisotsenko et al. |
| 7,258,923 B2 | 8/2007 | van den Bogerd et al. |
| 7,269,966 B2 | 9/2007 | Lowenstein et al. |
| 7,279,215 B2 | 10/2007 | Hester et al. |
| 7,306,650 B2 | 12/2007 | Slayzak et al. |
| 7,337,615 B2 | 3/2008 | Reidy |
| 7,430,878 B2 | 10/2008 | Assaf |
| 7,758,671 B2 | 7/2010 | Kesten et al. |
| 7,938,888 B2 | 5/2011 | Assaf |
| 8,337,590 B2 | 12/2012 | Herencia et al. |
| 8,353,175 B2 | 1/2013 | Wohlert |
| 8,496,732 B2 | 7/2013 | Culp et al. |
| 8,499,576 B2 | 8/2013 | Meijer |
| 8,500,960 B2 | 8/2013 | Ehrenberg et al. |
| 8,623,210 B2 | 1/2014 | Manabe et al. |
| 8,641,806 B2 | 2/2014 | Claridge et al. |
| 8,648,209 B1 | 2/2014 | Lastella |
| 8,695,363 B2 | 4/2014 | Tang et al. |
| 8,696,805 B2 | 4/2014 | Chang et al. |
| 8,769,971 B2 | 7/2014 | Kozubal et al. |
| 8,790,454 B2 | 7/2014 | Lee et al. |
| 8,800,308 B2 | 8/2014 | Vandermeulen et al. |
| 8,876,943 B2 | 11/2014 | Gottlieb et al. |

(56) References Cited

U.S. PATENT DOCUMENTS

| | | | |
|---|---|---|---|
| 8,881,806 B2 | 11/2014 | Xie et al. | |
| 8,968,945 B2 | 3/2015 | Fasold et al. | |
| 2001/0015500 A1 | 8/2001 | Shimanuki et al. | |
| 2002/0023740 A1 | 2/2002 | Lowenstein et al. | |
| 2002/0026797 A1 | 3/2002 | Sundhar | |
| 2002/0098395 A1 | 7/2002 | Shimanuki et al. | |
| 2002/0104439 A1 | 8/2002 | Komkova et al. | |
| 2002/0139245 A1 | 10/2002 | Kesten et al. | |
| 2002/0139320 A1 | 10/2002 | Shimanuki et al. | |
| 2002/0148602 A1 | 10/2002 | Nakamura | |
| 2003/0000230 A1 | 1/2003 | Kopko | |
| 2003/0029185 A1 | 2/2003 | Kopko | |
| 2003/0033821 A1 | 2/2003 | Maisotsenko et al. | |
| 2003/0051498 A1 | 3/2003 | Sanford | |
| 2003/0106680 A1 | 6/2003 | Serpico et al. | |
| 2003/0121271 A1 | 7/2003 | Dinnage et al. | |
| 2003/0230092 A1* | 12/2003 | Lowenstein | F24F 3/1417 62/94 |
| 2004/0040697 A1 | 3/2004 | Pierre et al. | |
| 2004/0061245 A1 | 4/2004 | Maisotsenko et al. | |
| 2004/0101698 A1 | 5/2004 | Yamanaka et al. | |
| 2004/0109798 A1 | 6/2004 | Chopard et al. | |
| 2004/0118125 A1 | 6/2004 | Potnis et al. | |
| 2004/0134212 A1 | 7/2004 | Lee et al. | |
| 2004/0168462 A1 | 9/2004 | Assaf | |
| 2004/0194944 A1 | 10/2004 | Hendricks et al. | |
| 2004/0211207 A1 | 10/2004 | Forkosh et al. | |
| 2004/0230092 A1 | 11/2004 | Thierfelder et al. | |
| 2004/0231512 A1 | 11/2004 | Slayzak et al. | |
| 2004/0261440 A1 | 12/2004 | Forkosh et al. | |
| 2005/0106021 A1 | 5/2005 | Bunker et al. | |
| 2005/0109052 A1 | 5/2005 | Albers et al. | |
| 2005/0133082 A1 | 6/2005 | Konold et al. | |
| 2005/0210907 A1 | 9/2005 | Gillan et al. | |
| 2005/0217485 A1 | 10/2005 | Olapinski et al. | |
| 2005/0218535 A1 | 10/2005 | Maisotsenko et al. | |
| 2005/0257551 A1 | 11/2005 | Landry | |
| 2006/0042295 A1* | 3/2006 | Assaf | F24F 3/1417 62/314 |
| 2006/0124287 A1 | 6/2006 | Reinders | |
| 2006/0156750 A1 | 7/2006 | Lowenstein et al. | |
| 2006/0278089 A1 | 12/2006 | Theilow | |
| 2007/0169916 A1 | 7/2007 | Wand et al. | |
| 2007/0175234 A1 | 8/2007 | Pruitt | |
| 2007/0234743 A1 | 10/2007 | Assaf | |
| 2008/0127965 A1 | 6/2008 | Burton | |
| 2008/0156471 A1 | 7/2008 | Han et al. | |
| 2008/0196758 A1 | 8/2008 | McGuire | |
| 2008/0203866 A1 | 8/2008 | Chamberlain | |
| 2008/0302357 A1 | 12/2008 | DeNault | |
| 2008/0314567 A1 | 12/2008 | Noren | |
| 2009/0000732 A1 | 1/2009 | Jacobine et al. | |
| 2009/0056919 A1 | 3/2009 | Hoffman et al. | |
| 2009/0095162 A1 | 4/2009 | Hargis et al. | |
| 2009/0173096 A1 | 7/2009 | Wohlert | |
| 2009/0183857 A1 | 7/2009 | Pierce et al. | |
| 2009/0200022 A1 | 8/2009 | Bravo et al. | |
| 2009/0238685 A1 | 9/2009 | Santa Ana | |
| 2010/0000247 A1 | 1/2010 | Bhatti et al. | |
| 2010/0018322 A1 | 1/2010 | Neitzke et al. | |
| 2010/0051083 A1 | 3/2010 | Boyk | |
| 2010/0084120 A1 | 4/2010 | Yin et al. | |
| 2010/0170776 A1 | 7/2010 | Ehrenberg et al. | |
| 2010/0319370 A1 | 12/2010 | Kozubal et al. | |
| 2011/0073290 A1 | 3/2011 | Chang et al. | |
| 2011/0100618 A1* | 5/2011 | Carlson | F24F 11/0001 165/287 |
| 2011/0101117 A1* | 5/2011 | Miyauchi | B01D 53/1425 236/44 A |
| 2011/0101549 A1* | 5/2011 | Miyauchi | B01D 53/1425 261/151 |
| 2011/0126885 A1 | 6/2011 | Kokotov et al. | |
| 2011/0132027 A1* | 6/2011 | Gommed | F24F 3/1417 62/477 |
| 2012/0052785 A1 | 3/2012 | Nagamatsu et al. | |
| 2012/0114527 A1 | 5/2012 | Hoglund et al. | |
| 2012/0118148 A1 | 5/2012 | Culp et al. | |
| 2012/0118155 A1 | 5/2012 | Claridge et al. | |
| 2012/0125020 A1 | 5/2012 | Vandermeulen et al. | |
| 2012/0125021 A1* | 5/2012 | Vandermeulen | B01D 53/263 62/94 |
| 2012/0125031 A1 | 5/2012 | Vandermeulen et al. | |
| 2012/0131937 A1 | 5/2012 | Vandermeulen et al. | |
| 2012/0131939 A1 | 5/2012 | Vandermeulen et al. | |
| 2012/0131940 A1* | 5/2012 | Vandermeulen | B01D 53/263 62/235.1 |
| 2012/0132513 A1 | 5/2012 | Vandermeulen et al. | |
| 2012/0152318 A1 | 6/2012 | Kee | |
| 2013/0056177 A1 | 3/2013 | Coutu et al. | |
| 2013/0101909 A1 | 4/2013 | Fasold et al. | |
| 2013/0186121 A1 | 7/2013 | Erb et al. | |
| 2013/0199220 A1 | 8/2013 | Ma et al. | |
| 2013/0227982 A1* | 9/2013 | Forkosh | B01D 53/263 62/271 |
| 2013/0255287 A1 | 10/2013 | Forkosh | |
| 2013/0340449 A1 | 12/2013 | Kozubal et al. | |
| 2014/0054004 A1 | 2/2014 | LePoudre et al. | |
| 2014/0054013 A1 | 2/2014 | LePoudre et al. | |
| 2014/0150481 A1 | 6/2014 | Vandermeulen | |
| 2014/0150656 A1 | 6/2014 | Vandermeulen | |
| 2014/0150657 A1 | 6/2014 | Vandermeulen et al. | |
| 2014/0150662 A1 | 6/2014 | Vandermeulen et al. | |
| 2014/0223947 A1 | 8/2014 | Ranjan et al. | |
| 2014/0245769 A1 | 9/2014 | Vandermeulen et al. | |
| 2014/0250935 A1 | 9/2014 | Prochaska et al. | |
| 2014/0260367 A1 | 9/2014 | Coutu et al. | |
| 2014/0260369 A1 | 9/2014 | LePoudre | |
| 2014/0260371 A1 | 9/2014 | Vandermeulen | |
| 2014/0260398 A1 | 9/2014 | Kozubal et al. | |
| 2014/0260399 A1 | 9/2014 | Vandermeulen | |
| 2014/0262125 A1 | 9/2014 | Erb et al. | |
| 2014/0262144 A1 | 9/2014 | Erb et al. | |
| 2014/0264968 A1 | 9/2014 | Erb et al. | |
| 2014/0360373 A1 | 12/2014 | Peacos et al. | |
| 2014/0366567 A1 | 12/2014 | Vandermeulen | |
| 2015/0323216 A1 | 11/2015 | Wallin | |
| 2015/0338140 A1 | 11/2015 | Vandermeulen | |

FOREIGN PATENT DOCUMENTS

| | | |
|---|---|---|
| CN | 102282426 A | 12/2011 |
| CN | 202229469 U | 5/2012 |
| EP | 1120609 A1 | 8/2001 |
| EP | 1563229 A1 | 8/2005 |
| EP | 1781995 A1 | 5/2007 |
| EP | 2256434 A2 | 12/2010 |
| EP | 2306100 A1 | 4/2011 |
| EP | 2787293 A1 | 10/2014 |
| JP | S54-77443 A | 6/1979 |
| JP | S62-297647 A | 12/1987 |
| JP | 02306067 A | 12/1990 |
| JP | H08-105669 A | 4/1996 |
| JP | H10-220914 A | 8/1998 |
| JP | H11-351700 A | 12/1999 |
| JP | 2000-230730 A | 8/2000 |
| JP | 2002-206834 A | 7/2002 |
| JP | 2004-524504 A | 8/2004 |
| JP | 2005-134060 A | 5/2005 |
| JP | 2006-263508 A | 10/2006 |
| JP | 2006-529022 A | 12/2006 |
| JP | 2009-517622 A | 4/2009 |
| JP | 04273555 B2 | 6/2009 |
| JP | 2009-281668 A | 12/2009 |
| JP | 2009-293831 A | 12/2009 |
| JP | 2010-247022 A | 11/2010 |
| JP | 2011-163682 A | 8/2011 |
| KR | 2004-0026242 A | 3/2004 |
| KR | 10-0510774 B1 | 8/2005 |
| KR | 2014-0022785 A | 2/2014 |
| TW | 201009269 A | 3/2010 |
| WO | WO-1997021061 A1 | 6/1997 |
| WO | WO-1999022180 A1 | 5/1999 |
| WO | WO-2000011426 A1 | 3/2000 |

(56) References Cited

FOREIGN PATENT DOCUMENTS

| WO | WO-2000055546 A1 | 9/2000 |
| WO | WO-2002066901 A1 | 8/2002 |
| WO | WO-2002086391 A1 | 10/2002 |
| WO | WO-2003004937 A1 | 1/2003 |
| WO | WO-2004046618 A1 | 6/2004 |
| WO | WO-2006006177 A1 | 1/2006 |
| WO | WO-2008037079 A1 | 4/2008 |
| WO | WO-2009094032 A1 | 7/2009 |
| WO | WO-2009144880 A1 | 12/2009 |
| WO | WO-2011062808 A1 | 5/2011 |
| WO | 2011150081 A2 | 12/2011 |
| WO | WO-2011161547 A2 | 12/2011 |
| WO | WO-2012071036 A1 | 5/2012 |
| WO | WO-2012082093 A1 | 6/2012 |
| WO | WO-2014152905 A1 | 9/2014 |
| WO | WO-2014201281 A1 | 12/2014 |
| WO | WO-2015077364 A1 | 5/2015 |

OTHER PUBLICATIONS

1—Open Absorption System for Cooling and Air Conditioning using Membrane Contactors—Annual Report 2005, Publication No. Publication 260097, Project: 101310—Open Absorption System for Cooling and Air Conditioning using Membrane Contactors, Date of publication: Mar. 31, 2006, Author: Manuel Conde-Petit, Robert Weber, Contractor: M. Conde Engineering.
2—Open Absorption System for Cooling and Air Conditioning using Membrane Contactors—Annual, Report 2006, Publication No. Publication 260098, Project: 101310—Open Absorption System for Cooling and Air Conditioning using Membrane Contactors, Date of publication: Nov. 14, 2006, Author: Manuel Conde-Petit, Robert Weber, Contractor: M. Conde Engineering.
3—Open Absorption System for Cooling and Air Conditioning Using Membrane Contactors—Final Report, Publication No. Publication 280139, Project: 101310—Open Absorption System for Cooling and Air Conditioning using Membrane Contactors, Date of publication: Jul. 8, 2008, Author: Viktor Dorer, Manuel Conde-Petit, Robert Weber, Contractor: M. Conde Engineering.
4—Conde-Petit, M. 2007. Liquid Desiccant-Based Air-Conditioning Systems—LDACS, Proc. of the 1st European Conference on Polygeneration—Technologies and Applications, 217-234, A. Coronas, ed., Tarragona—Spain, Oct. 16-17, Published by CREVER—Universitat Rovira I Virgili, Tarragona, Spain.
5—Conde-Petit, M. 2008. Open Absorption Systems for Air-Conditioning using Membrane Contactors,Proceedings '15. Schweizerisches Status-Seminar «Energie- und Umweltforschung im Bauwesen»', Sep. 11-12—ETH Zurich, Switzerland. Published by BRENET—Eggwilstr. 16a, CH-9552 Bronschhofen—Switzerland (brenet@vogel-tech.ch).
6—Third Party Observations for PCT/US2011/037936, dated Sep. 24, 2012.
Ashrae, et al., "Desiccant Dehumidification and Pressue Drying Equipment," 2012 Ashrae Handbook—HVAC Systems and Equipment, Chapter 24, pp. 24.1-24.12.
Beccali, et al., "Energy and Economic Assessment of Desiccant Cooling," Solar Energy, Issue 83, pp. 1828-1846, Aug. 2009.
European Search Report for EP13860583.7, dated Jun. 23, 2016.
Fimbres-Weihs, et al., "Review of 3D CFD modeling of flow and mass transfer in narrow spacer-filled channels in membrane modules," Chemical Engineering and Processing 49 (2010) pp. 759-781.
International Search Report and Written Opinion for PCT/US2013/073030, dated Mar. 13, 2014.
Li, F., et al., "Novel spacers for mass transfer enhancement in membrane separations," Journal of Membrane Science, 253 (2005), pp. 1-12.
Li, Y., et al., "CFD simulation of fluid flow through spacer-filled membrane module: selecting suitable cell types for periodic boundary conditions," Desalination 233 (2008) pp. 351-358.
Liu, et al., "Research Progress in Liquid Desiccant Air Conditioning Devices and Systems," Frontiers of Energy and Power Engineering in China, vol. 4, Issue 1, pp. 55-65, Feb. 2010.
Lowenstein, "A Solar Liquid-Desiccant Air Conditioner," Solar 2003, Proceedings of the 32nd ASES Annual Conference, Austin, TX, Jul. 2003.
Mathioulakis, "Desalination by Using Alternative Energy," Desalination, Issue 203, pp. 346-365, 2007.
Perry "Perry's Chemical Engineers handbook" 1999 McGraw Hill p. 11-52,11-53.
Russell, et al., "Optimization of Photovolatic Thermal Collector Heat Pump Systems," ISES International Solar Energy Conference, Atlanta, GA, vol. 3, pp. 1870-1874, May 1979.
Welty, "Liquid Desiccant Dehumidification," Engineered Systems, May 2010, vol. 27 Issue 5, p. 34.

* cited by examiner

METHODS AND SYSTEMS FOR COOLING BUILDINGS WITH LARGE HEAT LOADS USING DESICCANT CHILLERS

CROSS REFERENCE TO RELATED APPLICATIONS

This application is a continuation of U.S. patent application Ser. No. 14/096,445, filed on Dec. 14, 2013 entitled METHODS AND SYSTEMS FOR COOLING BUILDINGS WITH LARGE HEAT LOADS USING DESICCANT CHILLERS, which claims priority from U.S. Provisional Patent Application No. 61/733,209 filed on Dec. 4, 2012 entitled DESICCANT SYSTEMS and U.S. Provisional Patent Application No. 61/787,948 filed on Mar. 15, 2013 entitled METHODS AND SYSTEMS FOR COOLING BUILDINGS WITH LARGE HEAT LOADS USING DESICCANT CHILLERS, which are all hereby incorporated by reference.

BACKGROUND

The present application relates generally to the use of liquid desiccants to dehumidify an air stream entering a cooling tower. More specifically, the application relates to a cooling system construction that operates using a 2- or 3-way liquid desiccant mass and heat exchanger that can dehumidify an air stream entering a cooling tower, wherein the desiccant is absorbing moisture from the air stream in such a way that the cooling tower experiences a much higher temperature drop than is normally the case, and wherein the desiccant is subsequently regenerated using a waste heat source, which—if available—can be waste heat from the building itself, to which cooling is provided.

Datacenters are an example of buildings that contain a large amount of equipment that generates a large amount of sensible heat. Other examples include semiconductor manufacturing facilities, plastics processing facilities, industrial facilities, and other buildings where large internal sensible heat loads need to be dissipated. Datacenters typically do not have a large number of people in their space, so there is typically no need to bring in a lot of outside air, and therefore the outside air (which in other buildings can be as much as 60% of the overall heat- and moisture-load of a building) does generally not constitute a large load for a datacenter and neither is there a large humidity (latent) heat-load in the datacenter itself. Oftentimes the sensible heat that is generated in these buildings by computers and the like is rejected to a chilled water or cooling water loop that is connected to a central chiller facility, which in turn rejects its heat to a cooling tower. The problem with cooling towers is that in hot, humid climates, the cooling tower is unable to evaporate a lot of water and thus the temperature drop in the cooling water is not very large. This means that either the cooling tower has to be oversized or other means of heat rejection have to be employed. Most of the heat in a datacenter is rejected to a chilled water loop and some is rejected to the air in the datacenter which is replenished with outside air. Datacenters in effect use a lot of electricity and reject the heat that the electrical consumption generates to a chiller plant and eventually to a cooling tower. It could be very desirable if the datacenter's waste heat could be used for other purposes, in particular if the heat could be used for more efficient cooling of the datacenter itself.

Liquid desiccants have been used parallel to conventional vapor compression HVAC equipment to help reduce humidity in spaces, particularly in spaces that require large amounts of outdoor air or that have large humidity loads inside the building space itself. Humid climates, such as for example Miami, Fla. require a lot of energy to properly treat (dehumidify and cool) the fresh air that is required for a space's occupant comfort. Liquid desiccant systems are however not very common on datacenters and the like, simply because datacenters have large sensible loads internally and not large latent loads, nor do datacenter use large amounts of outside air. However, the cooling towers that support a datacenter do have large latent loads since they take in outside air. It would therefore be desirable to supply these cooling towers with dry air to improve their efficiency.

Liquid desiccant systems have been used for many years and are generally quite efficient at removing moisture from an air stream. However, liquid desiccant systems generally use concentrated salt solutions such as ionic solutions of $LiCl$, $LiBr$, or $CaCl_2$ and water. Such brines are strongly corrosive, even in small quantities, so numerous attempts have been made over the years to prevent desiccant carry-over to the air stream that is to be treated. In recent years efforts have begun to eliminate the risk of desiccant carry-over by employing micro-porous membranes to contain the desiccant. An example of such as membrane is the EZ2090 poly-propylene, microporous membrane manufactured by Celgard, LLC, 13800 South Lakes Drive Charlotte, N.C. 28273. The membrane is approximately 65% open area and has a typical thickness of about 20 μm. This type of membrane is structurally very uniform in pore size (100 nm) and is thin enough to not create a significant thermal barrier. It has been shown that these membranes are effective in inhibiting desiccant carry-over.

Liquid desiccant systems generally have two separate components. The conditioning side of the system provides conditioning of air to the required conditions, which are typically set using thermostats or humidistats. The regeneration side of the system provides a reconditioning function of the liquid desiccant most often using heat, so that it can be re-used on the conditioning side. Liquid desiccant is typically pumped between the two sides through a heat exchanger so as to prevent a large heat load from the regenerator on the conditioner.

There thus remains a need to provide a cooling system for datacenters and other buildings with high heat loads, wherein the datacenter's internally generated heat could be used for a more efficient cooling of the datacenter itself.

BRIEF SUMMARY

In accordance with one or more embodiments, a system is provided for providing cooling to a building. The system includes a cooling tower for transferring waste heat from the building to the atmosphere and a liquid desiccant system for dehumidifying an air stream entering the cooling tower to increase cooling efficiency of the cooling tower. The liquid desiccant system includes a conditioner and a regenerator. The conditioner utilizes a liquid desiccant for dehumidifying the air stream entering the cooling tower. The regenerator is connected to the conditioner for receiving dilute liquid desiccant from the conditioner, concentrating the dilute liquid desiccant using waste heat from the building, and returning concentrated liquid desiccant to the conditioner.

Provided herein are methods and systems used for the efficient dehumidification of an air stream using a liquid desiccant. In accordance with one or more embodiments, the liquid desiccant is running down the face of a support plate as a falling film. In accordance with one or more embodiments, the desiccant is contained by a microporous membrane and the air stream is directed in a primarily vertical orientation over the surface of the membrane and whereby both latent and sensible heat are absorbed from the air stream into the liquid desiccant. In accordance with one or more embodiments, the support plate is filled with a heat transfer fluid that ideally is flowing in a direction counter to the air stream. In accordance with one or more embodiments, the system comprises a conditioner that removes latent and sensible heat through the liquid desiccant and a regenerator that removes the latent and sensible heat from the system. In accordance with one or more embodiments, the heat transfer fluid in the conditioner is cooled by an external source of cold heat transfer fluid. In accordance with one or more embodiments, the regenerator is heated an external source of hot heat transfer fluid.

In accordance with one or more embodiments, the liquid desiccant conditioner is providing treated air to a cooling tower thereby making the cooling tower a more efficient device. In one or more embodiments, the treated air is cooler than the air would have been without a liquid desiccant dehumidifier. In one or more embodiments, the treated air is drier than the air would have been without a liquid desiccant dehumidifier. In one or more embodiments, the conditioner contains membranes to contain the liquid desiccant. In accordance with one or more embodiments the liquid desiccant conditioner is receiving cold water from the same cooling tower. In one or more embodiments, the cold water is delivered by a chiller system.

In accordance with one or more embodiments, the liquid desiccant regenerator is provided a warm air stream by directing a warm air stream from a building with high internal heat loads to the regenerator. In one or more embodiments, the regenerator receives hot waste water from the building. In one or more embodiments, the hot waste water and/or hot waste air is used to concentrate a desiccant.

In accordance with one or more embodiments, the external sources of cold and hot heat transfer fluid are idled while heat is transferred from the building with high heat load to the liquid desiccant side of the system. In one or more embodiments, the regenerator functions as a replacement for a cooling tower. In one or more embodiments, the conditioner and regenerator are both acting like a cooling tower. In one or more embodiments, the cooling tower and chiller are bypassed and the liquid desiccant system is actively cooling the datacenter. In one or more embodiments, the compressor of the chiller system is bypassed and liquid refrigerant is pumped without the use of a compressor.

In no way is the description of the applications intended to limit the disclosure to these applications. Many construction variations can be envisioned to combine the various elements mentioned above each with its own advantages and disadvantages. The present disclosure in no way is limited to a particular set or combination of such elements.

DETAILED DESCRIPTION

Figure 1:
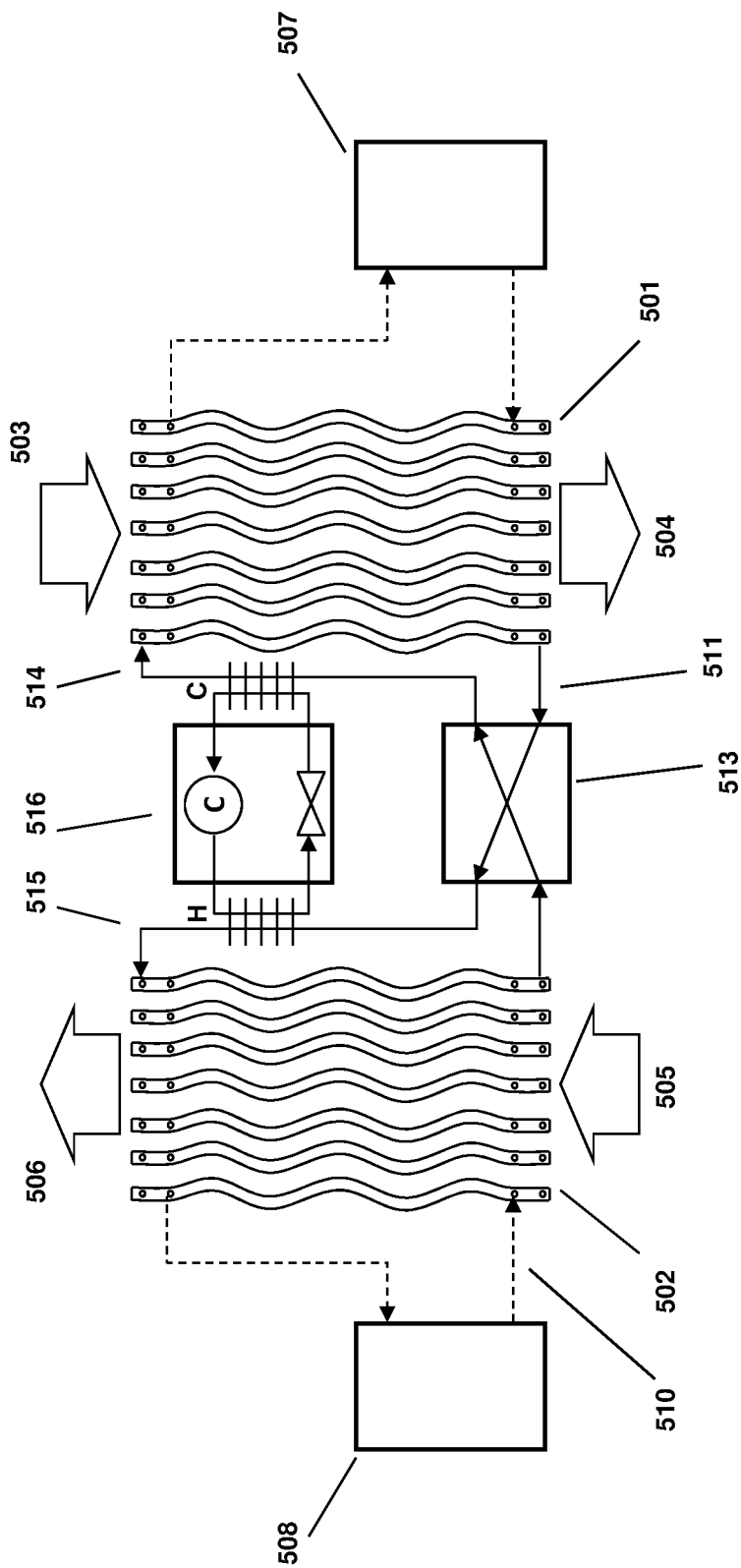
FIG. 1 illustrates a 3-way liquid desiccant air conditioning system using a chiller or external heating or cooling sources.

FIG. 1 depicts a new type of liquid desiccant system as described in further detail in U.S. patent application Ser. No. 13/115,736, filed on May 25, 2011, which is incorporated by reference herein. A conditioner 501 comprises a set of plate structures that are internally hollow. A cold heat transfer fluid is generated in cold source 507 and entered into the plates. Liquid desiccant solution at 514 is brought onto the outer surface of the plates and runs down the outer surface of each of the plates. The liquid desiccant runs behind a thin membrane that is located between the air flow and the surface of the plates. Outside air 503 is now blown through the set of wavy plates. The liquid desiccant on the surface of the plates attracts the water vapor in the air flow and the cooling water inside the plates helps to inhibit the air temperature from rising. The treated air 504 is put into a building space.

The liquid desiccant is collected at the bottom of the wavy plates at 511 and is transported through a heat exchanger 513 to the top of the regenerator 502 to point 515 where the liquid desiccant is distributed across the wavy plates of the regenerator. Return air or optionally outside air 505 is blown across the regenerator plate, and water vapor is transported from the liquid desiccant into the leaving air stream 506. An optional heat source 508 provides the driving force for the regeneration. The hot transfer fluid 510 from the heat source can be put inside the wavy plates of the regenerator similar to the cold heat transfer fluid on the conditioner. Again, the liquid desiccant is collected at the bottom of the wavy plates 502 without the need for either a collection pan or bath so that also on the regenerator the air can be vertical. An optional heat pump 516 can be used to provide cooling and heating of the liquid desiccant. It is also possible to connect a heat pump between the cold source 507 and the hot source 508, which is thus pumping heat from the cooling fluids rather than the desiccant.

Figure 2:
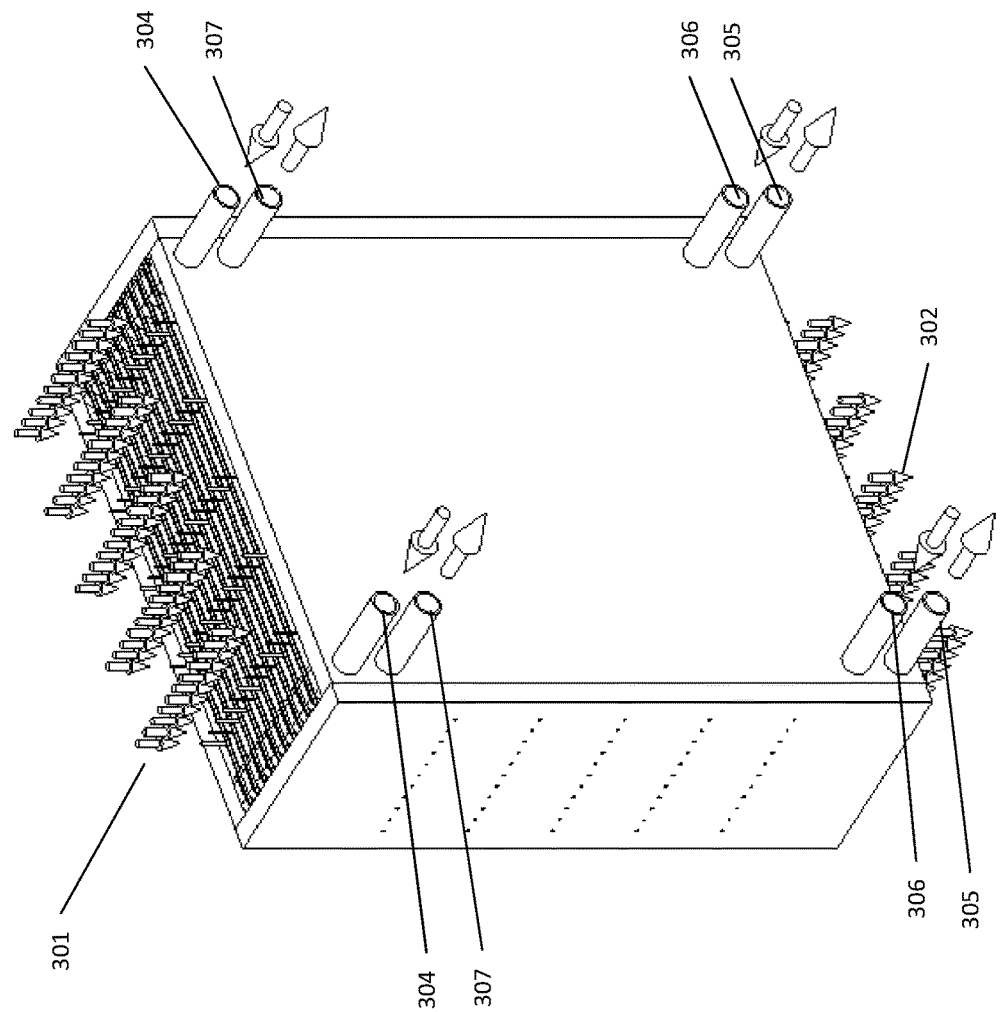
FIG. 2 shows a flexibly configurable membrane module that incorporates 3-way liquid desiccant plates.

FIG. 2 describes a 3-way heat exchanger as described in further detail in U.S. patent application Ser. No. 13/915,199 filed on Jun. 11, 2013, Ser. No. 13/915,222 filed on Jun. 11, 2013, and Ser. No. 13/915,262 filed on Jun. 11, 2013, which are all incorporated by reference herein. A liquid desiccant enters the structure through ports 304 and is directed behind a series of membranes as described in FIG. 1. The liquid desiccant is collected and removed through ports 305. A cooling or heating fluid is provided through ports 306 and runs counter to the air stream 301 inside the hollow plate structures, again as described in FIG. 1 and in more detail in FIG. 3. The cooling or heating fluids exit through ports 307. The treated air 302 is directed to a space in a building or is exhausted as the case may be.

Figure 3:
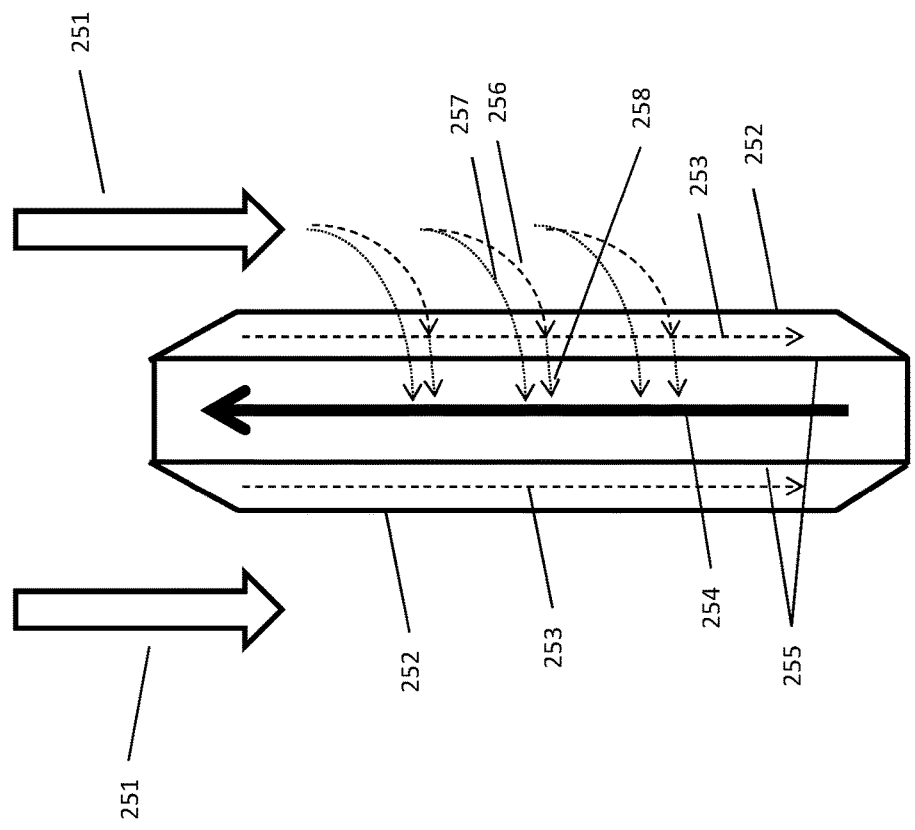
FIG. 3 illustrates an example of a single membrane plate in the liquid desiccant membrane module of FIG. 2.

FIG. 3 describes a 3-way heat exchanger as described in more detail in U.S. Provisional Patent Application Ser. No. 61/771,340 filed on Mar. 1, 2013, which is incorporated by reference herein. The air stream 251 flows counter to a cooling fluid stream 254. Membranes 252 contain a liquid desiccant 253 that is falling along the wall 255 that contain a heat transfer fluid 254. Water vapor 256 entrained in the air stream is able to transition the membrane 252 and is absorbed into the liquid desiccant 253. The heat of condensation of water 258 that is released during the absorption is conducted through the wall 255 into the heat transfer fluid 254. Sensible heat 257 from the air stream is also conducted through the membrane 252, liquid desiccant 253 and wall 255 into the heat transfer fluid 254.

Figure 4:
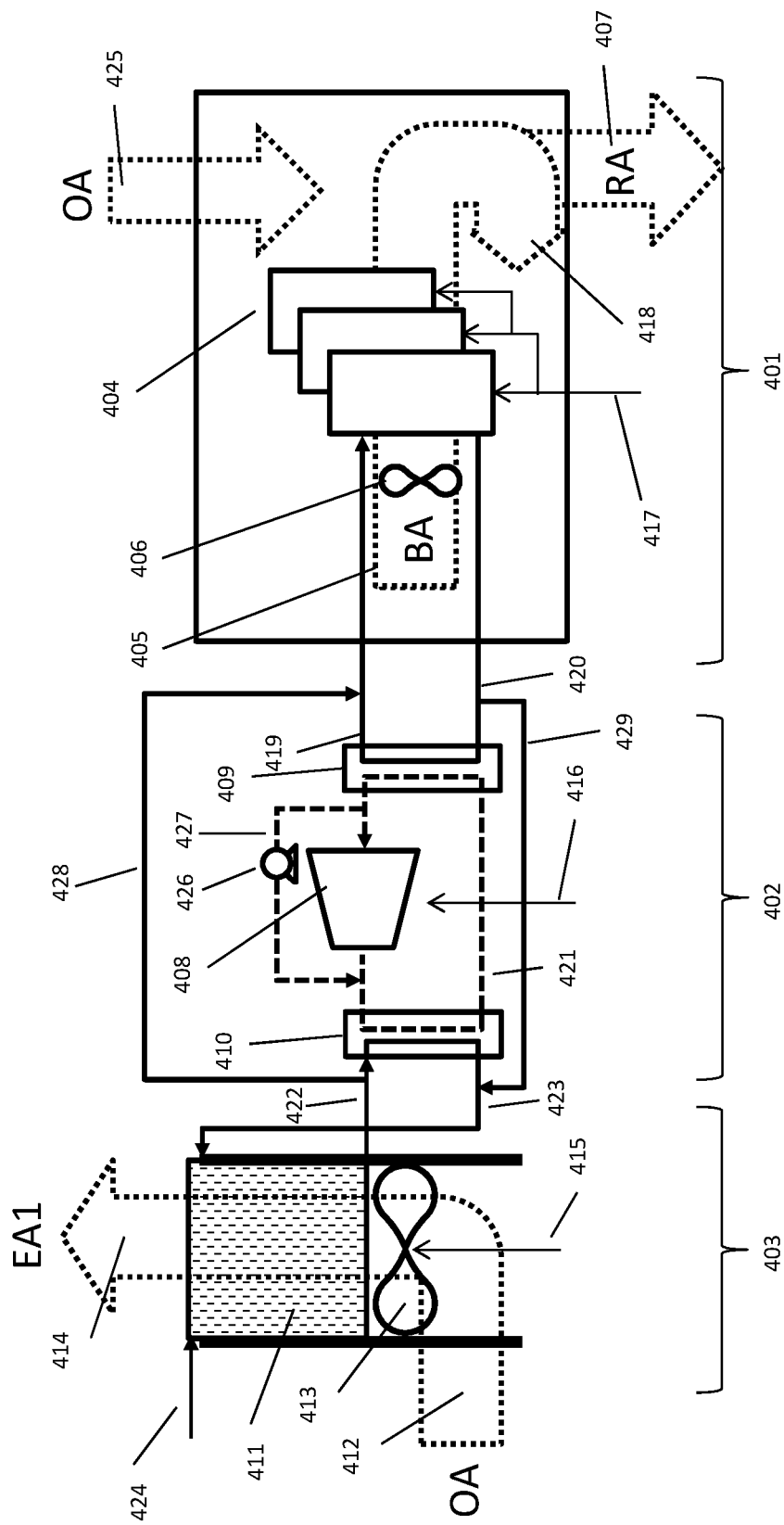
FIG. 4 shows a typical datacenter cooling system setup.

FIG. 4 shows a high level schematic of a typical datacenter cooling system setup. The datacenter itself 401 comprises a large number of computer racks 404 that are cooled by fans 406 that blow building air ("BA") 405 through the computer racks 404 or the computer racks 404 are cooled by heat transfer fluid (oftentimes cooling water) 419. Some of the air recirculates 418 in the space itself; however some of the air 407 ("RA") is exhausted. The exhausted air 407 is made up by an external outside air intake 425 ("OA"). The computer racks 404 are powered by electricity feeds 417 and the heat that is generated by the electrical consumption is rejected to the cooling water 420, the exhaust air 407 and the recirculating air 418. The chiller system 402 receives the cooling water 420 which is pumped through an evaporator heat exchanger 409 that is the evaporator of the chiller system 402 with compressor 408 compressing a refrigerant 421. The heat of compression is rejected to condenser heat exchanger 410. The heat exchanger 410 is then coupled to a cooling tower 403 that includes a fan 413 that blows outside air ("OA") 412 through a filter media 411 which is then exhausted at near fully saturated conditions 414 ("EA1"). Cooling water 423 is sprayed on top of the filter media 411 where a portion of the cooling water evaporates. This causes a cooling effect in the water and the cooled water 422 is pumped back to the heat exchanger 410. Make-up water 424 is provided to the cooling tower to replace the water that is lost through evaporation. It is possible to not compress the refrigerant using compressor 408, but instead to use a refrigerant pump 426 to create a refrigerant bypass loop 427 that can be used in part-load conditions, which can lead to substantial energy savings. It is also possible to use a cooling fluid bypass loop 428 and return cooling fluid loop 429 that bypasses the chiller section entirely. The electrical consumption of the complete system comprises primarily of electrical power 417 provided to the datacenter 401, which largely turns into sensible heating of the building air 405 and cooling water 419. Other electrical consumption comprises electrical power 416 for the chiller plant 402 and primarily the compressors 408 inside that plant and electrical power 415 for the cooling tower 403, which is relatively small compared to the datacenter electrical power 417 and chiller plant electrical power 416.

Figure 5:
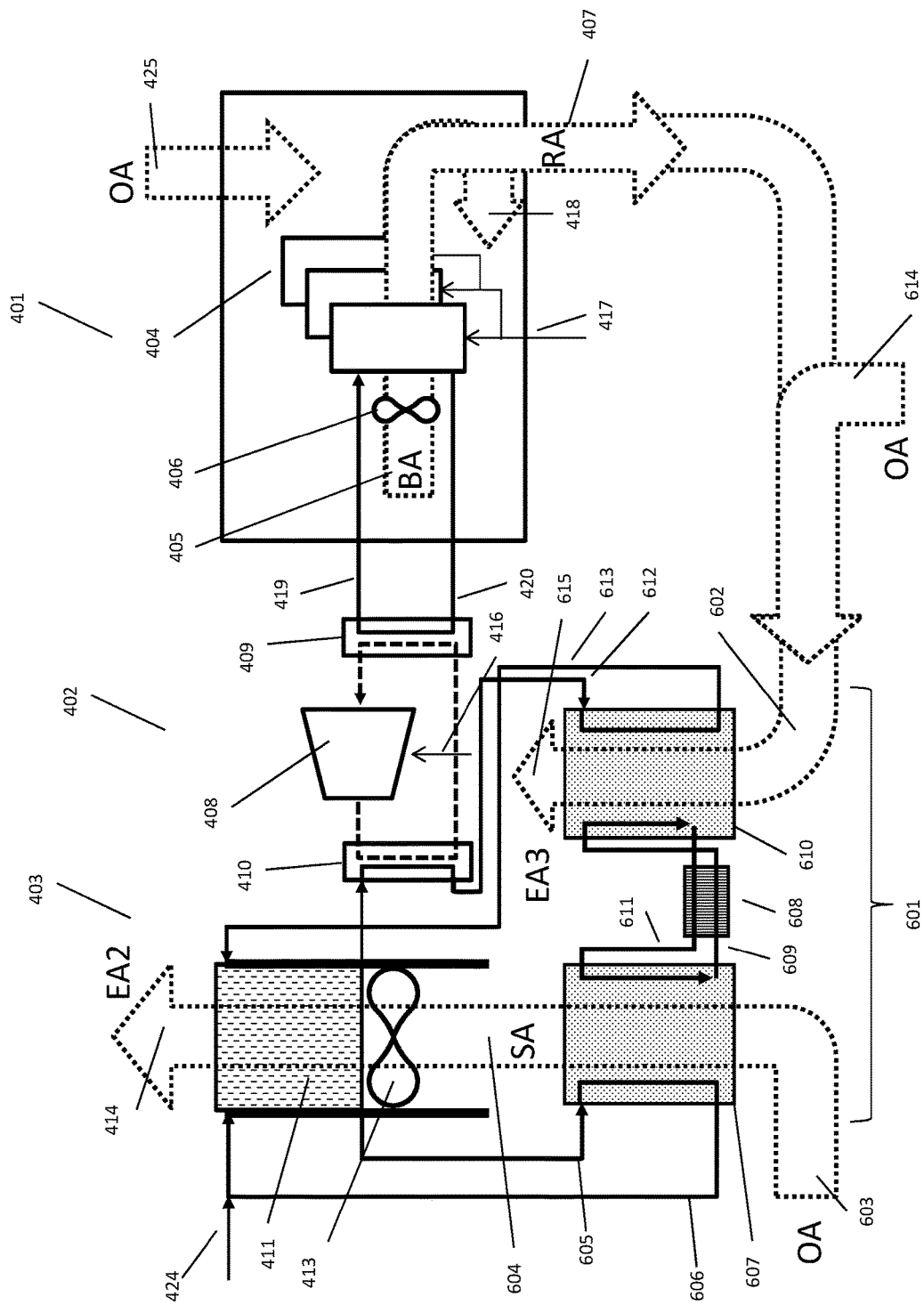
FIG. 5 shows the integration between a liquid desiccant system and the datacenter cooling system from FIG. 4 in accordance with one or more embodiments.

FIG. 5 illustrates the integration of the datacenter cooling system of FIG. 4 with a liquid desiccant cooling system. The liquid desiccant system 601 comprises a 3-way conditioner 607 (shown in FIG. 1 as 501) and a 3-way regenerator 610 (shown in FIG. 1 as 502). The conditioner 607 receives cold water 605 from the cooling tower. Concentrated liquid desiccant 611 is supplied to the 3-way conditioner 607. Outside air 603 ("OA") is supplied to the conditioner 607 as well, which results in a much cooler and drier air stream 604 ("SA") supplied to the cooling tower 403. The liquid desiccant 611 absorbs moisture in the air stream 603 while simultaneously cooling the air stream. The supply air 604 ("SA") to the cooling tower is thus drier and cooler then the outside air was. The warmer cooling water 606 is returned to the cooling tower. Diluted desiccant 609 is pumped through a heat exchanger 608 to the 3-way regenerator 610. The regenerator 610 receives hot water 612 from the chiller's condenser heat exchanger 410 which is used as a heat source for desiccant regeneration. The somewhat cooler water 613 coming from the regenerator 610 is subsequently directed to the cooling tower 403 or back towards the condenser heat exchanger 410. Warm return air 407 ("RA") from the data center 401 is directed to the regenerator 610. An outside air stream 614 can optionally be mixed in with the return air to create a mixed air condition 602. The dilute desiccant 609 is directed over the regenerator plates and is thus re-concentrated by the heat from the datacenter. The regenerator exhausts a much higher temperature and humidity air stream 615 ("EA3"), which contains the water vapor that was removed at the conditioner 607. Like the system of FIG. 4, it is possible to not compress the refrigerant using compressor 408, but instead to use a refrigerant pump 426 to create a refrigerant bypass loop 427 that can be used in part-load conditions, which can lead to substantial energy savings. It is also possible to use a cooling fluid bypass loop 428 and return cooling fluid loop 429 that bypasses the chiller section entirely. The refrigerant bypass loop and cooling fluid bypass loops have been omitted from the figure for clarity.

Figure 6:
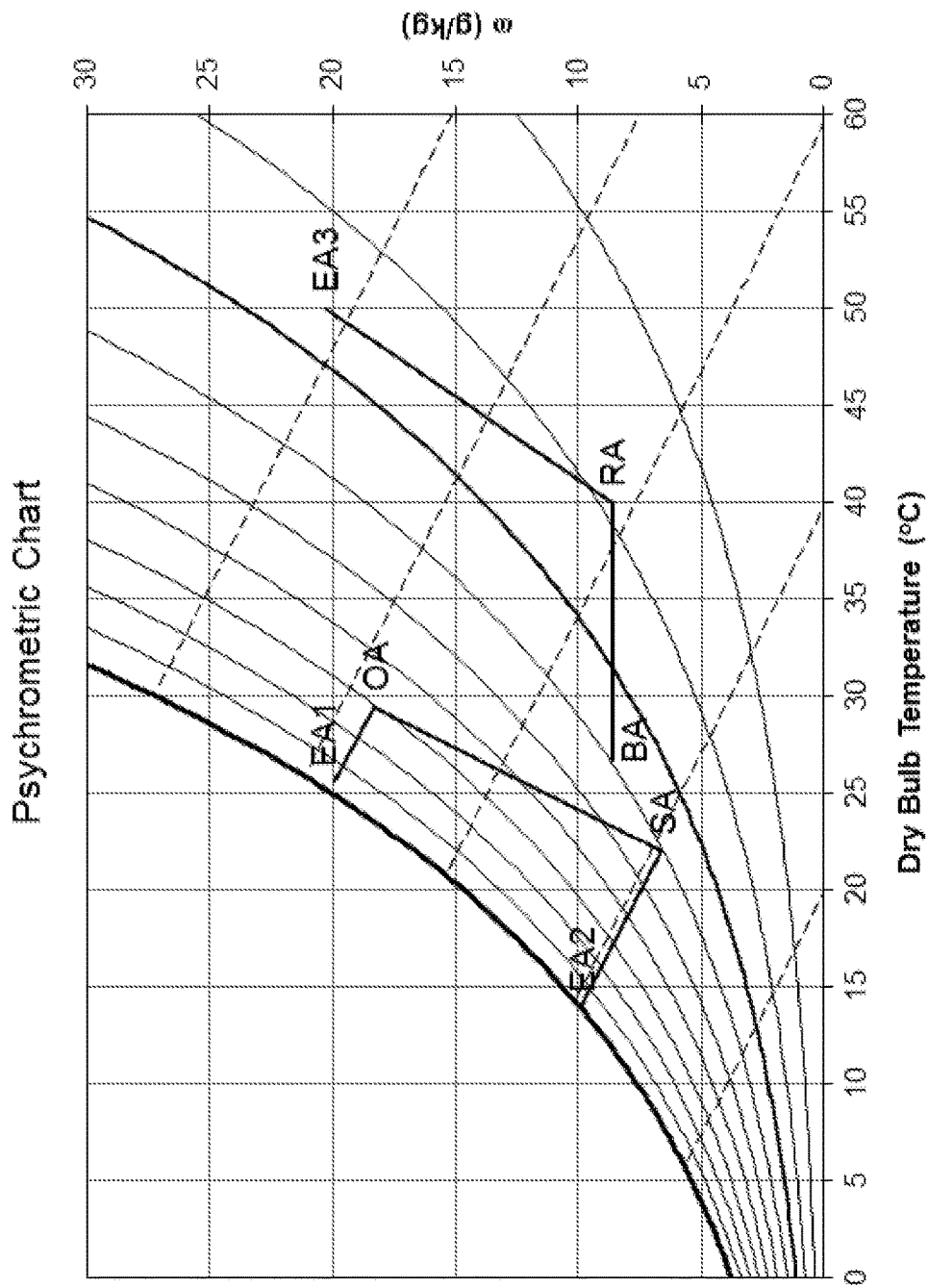
FIG. 6 illustrates the psychrometric processes of FIGS. 4 and 5 in accordance with one or more embodiments.

FIG. 6 illustrates the psychometric processes in the system of FIGS. 4 and 5. In a conventional cooling tower (as illustrated in FIG. 4) the outside air (labeled "OA") is subjected to an adiabatic humidification process (line segment OA to EA1) and the air leaves the cooling tower at a slightly lower temperature but more humid (point EA1). However, with a desiccant conditioner the outside air ("OA") is cooled and dehumidified (line segment OA to SA) and the cooler and drier air SA is supplied to the cooling tower, wherein the air undergoes an adiabatic humidification process (line segment SA to EA2). This results in a much more efficient cooling process since the temperature of EA2 is significantly below the temperature of EA1. In essence the waste heat air 407 of the datacenter has been used to create a concentrated desiccant, which otherwise would have been rejected without getting used. The regenerator process is shown as well: the building air 405 ("BA") is heated by the equipment 404 in the space to a higher sensible temperature but without adding any significant water vapor. The resulting waste heat air 407 ("RA") is then directed through the regenerator plates where both heat and moisture are added resulting in an exhaust air stream

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments. Additionally, elements and components described herein may be further divided into additional components or joined together to form fewer components for performing the same functions. Accordingly, the foregoing description and attached drawings are by way of example only, and are not intended to be limiting.

What is claimed is:

1. A system for providing cooling to a building, comprising:
    an evaporative cooling unit utilizing water for transferring waste heat from the building to the atmosphere; and
    a liquid desiccant system for dehumidifying an air stream from outside the building, said liquid desiccant system connected to the evaporative cooling unit such that the air stream dehumidified by the liquid desiccant system is provided to the evaporative cooling unit to increase cooling efficiency of the evaporative cooling unit, said liquid desiccant system comprising:
a conditioner utilizing a liquid desiccant for dehumidifying the air stream provided to the evaporative cooling unit; and
a regenerator connected to the conditioner for receiving dilute liquid desiccant from the conditioner, said regenerator configured to concentrate the dilute liquid desiccant using waste heat from the building and return concentrated liquid desiccant to the conditioner.

2. The system of claim 1, wherein the conditioner is connected to the evaporative cooling unit through a first heat transfer fluid loop such that cooled heat transfer fluid from the tower cools the liquid desiccant in the conditioner,
wherein the system further comprises a chiller system connected to the building by a second heat transfer fluid loop, wherein heat from the building is rejected to the chiller system through the second heat transfer fluid loop;
and wherein the evaporative cooling unit is connected to the chiller system by a third heat transfer fluid loop, wherein heat from the chiller system is rejected to the evaporative cooling unit through the third heat transfer fluid loop.

3. The system of claim 1, wherein the regenerator is also connected to the chiller system through the third heat transfer fluid loop to heat liquid desiccant in the regenerator.

4. The system of claim 3, wherein the regenerator is connected to the evaporative cooling unit such that heat transfer fluid in the third heat transfer fluid loop flows from the regenerator to the evaporative cooling unit.

5. The system of claim 1, wherein the conditioner comprises a plurality of structures, each structure having at least one surface across which the liquid desiccant in the conditioner can flow, wherein the air stream flows through or between the structures such that the liquid desiccant dehumidifies and cools the air stream.

6. The system of claim 5, wherein each of the plurality of structures includes a passage through which a heat transfer fluid can flow.

7. The system of claim 6, wherein the liquid desiccant and the heat transfer fluid flow in generally opposite directions in the conditioner.

8. The system of claim 6, further comprising a sheet of material positioned proximate to the at least one surface of each structure between the liquid desiccant and the air stream, said sheet of material permitting transfer of water vapor between the liquid desiccant and the air stream.

9. The system of claim 8, wherein the sheet of material comprises a microporous membrane.

10. The system of claim 1, wherein the regenerator includes a plurality of structures, each structure having at least one surface across which the liquid desiccant in the regenerator can flow, wherein an air stream flows through or between the structures causing the liquid desiccant to desorb water to the air stream.

11. The system of claim 10, wherein each of the plurality of structures in the regenerator includes a passage through which a heat transfer fluid can flow.

12. The system of claim 11, wherein the liquid desiccant and the heat transfer fluid flow in generally opposite directions in the regenerator.

13. The system of claim 10, further comprising a sheet of material positioned proximate to the at least one surface of each structure between the liquid desiccant and the air stream, said sheet of material permitting transfer of water vapor between the liquid desiccant and the air stream.

14. The system of claim 13, wherein the sheet of material comprises a microporous membrane.

15. The system of claim 1, wherein the building comprises a data center or an industrial manufacturing or processing facility.

16. A method for providing cooling to a building, comprising:
transferring waste heat from the building to an evaporative cooling unit to be released into the atmosphere; and
dehumidifying an air stream from outside the building and providing the dehumidified air stream to the evaporative cooling unit to increase cooling efficiency of the evaporative cooling unit using a liquid desiccant system by:
utilizing a liquid desiccant in a conditioner for dehumidifying the air stream entering the evaporative cooling unit; and
receiving dilute liquid desiccant from the conditioner at a regenerator, concentrating the dilute liquid desiccant using waste heat from the building, and returning concentrated liquid desiccant to the conditioner.

17. The method of claim 16, further comprising further heating the liquid desiccant in the regenerator using hot waste heat from the building.

18. The method of claim 16, wherein transferring waste heat from the building to the evaporative cooling unit comprises rejecting heat from the building to a chiller system, and rejecting heat from the chiller system to the evaporative cooling unit.

19. The method of claim 16, further comprising transferring heat transfer fluid between the regenerator and the evaporative cooling unit.

20. The method of claim 16, wherein the building comprises a data center or an industrial manufacturing or processing facility.

* * * * *